(12) United States Patent
Hawkes et al.

(10) Patent No.: US 6,391,352 B1
(45) Date of Patent: May 21, 2002

(54) CO-PROCESSED STARCH/GUM BASED FOOD INGREDIENT AND METHOD OF MAKING THE SAME

(75) Inventors: James G. Hawkes, Wheaton; Jane K. Zeien, DeKalb, both of IL (US)

(73) Assignee: Continental Colloids Inc., West Chicago, IL (US)

( * ) Notice: Subject to any disclaimer, the term of this patent is extended or adjusted under 35 U.S.C. 154(b) by 0 days.

(21) Appl. No.: 09/115,659

(22) Filed: Jul. 15, 1998

(51) Int. Cl.$^7$ .............................. A23L 1/216; A23G 1/00
(52) U.S. Cl. ...................... 426/96; 426/103; 426/661; 127/67; 127/69
(58) Field of Search .............................. 127/69, 28, 32, 127/65, 67; 426/661, 103, 96, 589

(56) References Cited

U.S. PATENT DOCUMENTS

| | | | |
|---|---|---|---|
| 3,265,509 A | * 8/1966 | Wurzburg et al. | 99/134 |
| 4,812,445 A | * 3/1989 | Eden et al. | 514/60 |
| 4,859,484 A | * 8/1989 | Bielskis et al. | 426/573 |
| 4,948,615 A | * 8/1990 | Zallie et al. | 426/578 |
| 5,131,953 A | * 7/1992 | Kasica et al. | 127/65 |
| 5,281,432 A | * 1/1994 | Zallie et al. | 426/549 |
| 5,294,457 A | * 3/1994 | Jenkins et al. | 426/573 |
| 5,424,088 A | * 6/1995 | Christianson et al. | 426/578 |
| 5,435,851 A | * 7/1995 | Kasica et al. | 127/69 |
| 5,470,391 A | * 11/1995 | Mallee et al. | 127/38 |
| 5,547,513 A | * 8/1996 | Mallee et al. | 127/38 |
| 5,571,552 A | * 11/1996 | Kasica et al. | 426/573 |
| 5,584,937 A | * 12/1996 | Finnocchario | 127/38 |
| 5,614,243 A | * 3/1997 | Dunn et al. | 426/578 |
| 5,755,890 A | * 5/1998 | Yuan | 127/71 |
| 5,849,090 A | * 12/1998 | Haralampu et al. | 127/65 |

* cited by examiner

*Primary Examiner*—Nina Bhat
(74) *Attorney, Agent, or Firm*—Marshall, Gerstein & Borun

(57) ABSTRACT

Disclosed is a starch/gum based ingredient for use in food products which includes a high amylose starch and a hydrocolloid, edible gum to which water is added and co-processed in an extruder under conditions of temperatures of about 100° C. or more and moisture levels of at least about 16.7% and relatively high shear. The ingredient provides desirable texture and mouth feel characteristics to food products in which it is incorporated, and provides a white color along with improved opacity. Flavor release is improved and storage stability is controlled. It also serves as a processing aid. Also disclosed is a method of making the ingredient and various food products embodying the ingredient.

29 Claims, 1 Drawing Sheet

CO-PROCESSED STARCH/GUM BASED FOOD INGREDIENT AND METHOD OF MAKING THE SAME

FIELD OF THE INVENTION

This invention relates to a starch/gum based food ingredient. More specifically, it relates to a starch/gum based food ingredient that may be utilized to achieve desired textures in a food product, to contribute whitening/opacity and improved flavor release, as well as act as a general processing aid in viscosity control.

BACKGROUND OF THE INVENTION

The manufacturer of prepared food products must take into account a number of factors that potentially affect their manufacturability and their salability of the product. Concerns related to manufacturability involve a variety of considerations such as ease of handling ingredients, energy costs associated with processing during manufacture, waste of product ingredients, and the quantity and effect of effluent waste streams resulting from the manufacturing process.

In terms of salability of a product, cost is an important factor and sensory issues bearing on consumer acceptance are extremely important. Included among these are texture or so-called "mouth feel" and general physical appearance of the product, i.e., does the product have a pleasing appearance. As an example, one need only consider the contrast in color and mouth feel between non-fat (skim) milk and milks containing varying percentages of fat to recognize the importance of this factor. Other factors include overall flavor profiles and the ability of the product to release its flavor. Shelf life is also a considerable concern.

Many of the foregoing factors are affected favorably by the use of gums as an additive to food products. Edible gums such as carrageenan, xanthan, locust bean, guar, carboxymethyl cellulose, and pectin have long been used for a variety of purposes as, for example, to bind water, provide increased viscosity, suspend solids, stabilize emulsions, retard crystallization in frozen desserts, and prevent syneresis in cultured dairy products. The modem trend toward nonfat or lowfat products has dramatically increased the usage of such gums, alone and in combination with various sources of starch. Starch/gum blends may be used to replace fat removed from the particular food item of concern, such as nonfat ice cream, nonfat yogurt, or nonfat sour cream. Frequently the blends are purely mechanical blends, which is to say that the ingredients in the blend do not physically or chemically interact to provide entirely new properties that might enhance their value.

It has therefore been proposed to blend starch with hydrocolloids such as the gums identified above in such a way that the blending is more than a mere mechanical mixture of the components. In commonly assigned U.S. Pat. No. 4,859,484, issued Aug. 22, 1989, to Bielskis, et al., and assigned to the assignee of the present application, there is disclosed a product and a method of making the same which involves separately hydrating a starch and a hydrocolloid which are then intimately co-mingled, heated, cooled, dried, and pulverized to produce the finished food additive. The resulting food ingredient serves as a stabilizer for frozen desserts, and when using guar gum as the hydrocolloid, functions as a replacement for more expensive locust bean or cellulose gums or at least allows a reduction in the quantity of the expensive gums that are required.

The Bielskis, et al. patent discloses a method and a product made thereby that is said to work well with any of a variety of starch sources. Traditionally, however, so-called "high amylose starches" (a starch that is 40% or more amylose) have been avoided because they have been difficult to process due to their high gelatinization temperatures. At the same time, the benefits of pre-processed high amylose starches have been recognized to include stronger gels, improved appearance and adhesion properties, as well as better textural characteristics in the final product. Patents of interest relating thereto include Kasica et al. U.S. Pat. No. 5,131,953, issued Jul. 21, 1992, and Zallie et al. U.S. Pat. No. 5,281,432, issued Jan. 25, 1994.

The use of suspensions of high amylose starch in an excess water slurry with mild shearing during heating and subsequent cooling to provide an ingredient that acts as a fat replacer or whitening agent is disclosed in Baensch, et al. patent document WO 9603057 of 1996. See also Christianson, et al. U.S. Pat. No. 5,424,088.

Finocchiaro in U.S. Pat. No. 5,584,937, issued Dec. 17, 1996, discloses a high amylose starch texturizing agent that is useful as a fat replacement. Mallee et al. U.S. Pat. No. 5,470,391, issued Nov. 28, 1995, discloses the application of such products to foods such as mayonnaise, salad dressings, yogurt, cottage cheese, sour cream, cream cheese, peanut butter, frosting, cheesecake, mousse, and other sauces. Similarly, Finocchiaro in U.S. Pat. No. 5,679,395, issued Oct. 21, 1997, discloses fat free or lowfat products utilizing modified starch/gum based ingredients employing high amylose starches.

While these products appear to work well for their intended purposes, the processes by which they are formed are relatively intense and expensive, and often difficult to control. The present invention is directed to overcoming one or more of the above problems.

SUMMARY OF THE INVENTION

It is the principal object of the invention to provide a new and improved starch/gum based ingredient for food products. More specifically, it is an object of the invention to provide a starch/gum based ingredient that is easy to manufacture, one that reduces energy requirements to produce the ingredient, one that minimizes or eliminates ingredient wastage, and one that produces no significant effluent stream. It is also an object of the invention to provide a method of making such a starch/gum based food ingredient as well as various food products with which the ingredient may be usefully employed.

An exemplary embodiment of the invention, according to one facet thereof, provides a starch/gum based ingredient that includes a starch, water, and a hydrocolloid selected from the group consisting of xanthan gum, guar gum, locust bean gum and combinations thereof, co-processed in an extruder at elevated temperature, under conditions of high shear, and with a water content of about 16.7% to about 50%.

More particularly, the invention involves intimately combining different carbohydrate polymers under moderate moisture and appropriate temperature levels in order to process the blends in a manner to achieve an appropriate degree of physical interaction of the individual components to promote maximum functionality as a novel value-added food ingredient. The starch employed will typically have an amylose content varying from 23–70%.

Typically, the elevated temperature is greater than about 100° C.

Preferably, the hydrocolloid is xanthan gum.

According to another facet of the invention, a method of making a starch/gum based ingredient for use in a food product includes the steps of: a) providing a dry feed of 50–99% high amylose starch and 1–50% of a hydrocolloid selected from the group consisting essentially of xanthan gum, guar gum, locust bean gum, and mixtures thereof; b) introducing the dry feed and water into a cooker/extruder at a water to dry mix ratio of about 0.20–0.47; c) mixing the water and dry feed and elevating the temperature thereof within the cooker/extruder to a barrel temperature within the range of about 100–210° C. to at least partially cook the materials; d) extruding the product resulting from step c) through a die to expand and partially dry the product; e) drying the extruded product to a moisture content of 20% or less; and f) reducing the dried extruded product to a desired size.

Preferably, the drying step reduces the moisture content to 10% or less and the reducing step reduces the extruded product to a powder.

The invention also contemplates, according to still another facet thereof, a food product containing an effective amount of the ingredient produced by the method as set forth above, and further including additional ingredients of a food product selected from the group consisting of salad dressings, soups, sauces, frozen desserts, candy, yogurts, and sour cream.

Depending upon the particular food product being manufactured, the starch/gum based ingredient is introduced into the food product in the range of about 0.1 to about 2.0 percent by weight.

Other objects and advantages will become apparent from the following specification taken in connection with the accompanying drawing.

DESCRIPTION OF THE DRAWING

The FIGURE is a flow diagram of an exemplary embodiment of a method of making a starch/gum based ingredient for use in a food product.

DESCRIPTION OF THE PREFERRED EMBODIMENT

Figure 1:
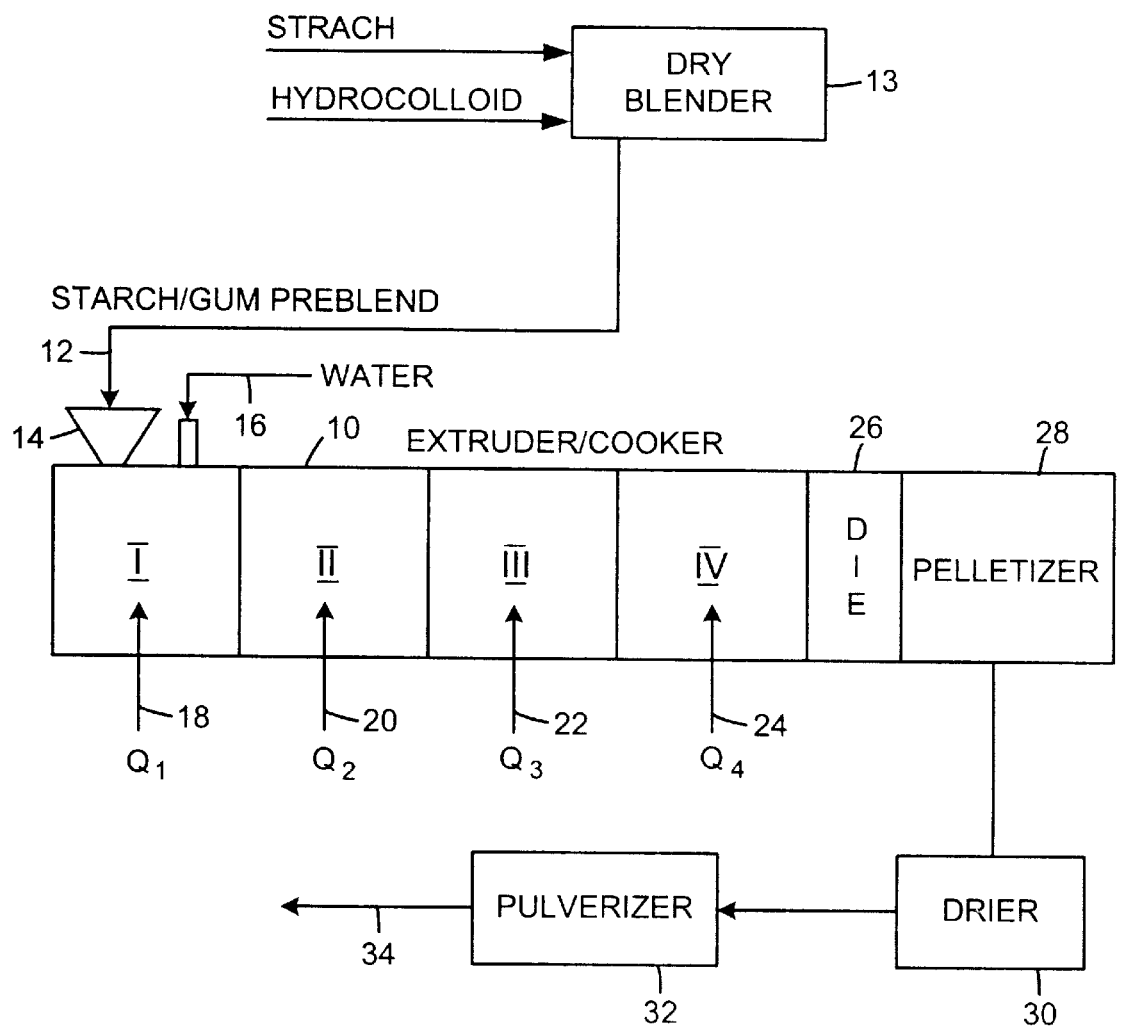

As is well known, starch is composed of two major fractions, amylose, having a molecular weight in the range of 1.9 to $2.6 \times 10^6$ and amylopectin, having a molecular weight of about 0.6 to $5.0 \times 10^8$. Amylose is composed of mostly linear chains of glucose units, whereas amylopectin is a branched polymer fraction with a similar backbone, but with branching and about 20–25 glucose units per branch.

In the presence of cold water, native starch granules are insoluble. However, they may reversibly absorb water and slightly swell. Upon drying, the granules return to their natural state. Reversible swelling is believed to occur up to the point at which the gelatinization temperature is reached, beyond which irreversible changes take place.

It is thought that the phase transition that occurs during the heating of starch occurs as four steps as the water content gradually increases within a starch granule. The first step involves the insertion of water of crystallization into defined positions in the crystallites. As the temperature increases, the starch molecules increase their vibratory motion, resulting in breaking of intermolecular bonds and allowing more hydrogen bonding between water molecules and the starch. The second step involves limited swelling of the gel or amorphous phases of the starch. The penetration of water increases the separation between starch chains within the granule and generally disrupts the intramolecular order.

This is followed by the melting of the crystallites and finally, by hydration of the molten crystallites together with hydration of non-crystalline gel regions. There is a decrease in the size and number of crystalline regions with continued heating until there is a total loss of crystallinity. With sufficient water and heat, the loss of the crystalline regions results in amylose diffusing out from the starch granules, causing an eventual collapse of the granules and increased numbers of water molecules attaching to exposed OH-groups on the starch molecules. A colloidal gel results with amylose supporting the collapsed granules, which in turn are composed mainly of amylopectin. Viscosity development during starch gelatinization is not only due to the swelling of the starch granules, but also due to the interassociation of amylose chains which leach out from the granules during the heating stage. Interaction between these amylose chains and other macromolecular solutes may take place, further altering the viscosity of the system. This can greatly affect the degree of retrogradation normally associated with the aging of starch gels.

Retrogradation refers to both gelation of amylose from concentrated solutions and precipitation from dilute solutions, particularly at low temperatures. This phenomenon results from the inherent tendency of amylose molecules to undergo conformational reordering to subsequently align or aggregate, increasing the degree of crystallinity. The rate of retrogradation increases with increasing amylose concentration and decreasing temperature. It has a sharp maximum at an amylose degree of polymerization of eighty (glucose units), whereas both shorter and longer molecules are more soluble.

A common example of retrogradation is the staling of bread. Upon heating the bread, a great deal of the retrogradation is reversed. Addition of various emulsifiers which complex with the helical structure of amylose also prevent retrogradation from occurring. Consequently, it is believed that by associating the helical amylose structures with other components, it retards the retrogradation process.

In starch containing systems, one of the main factors affecting texture is the degree of gelatinization of starch granules. Interactions between soluble components and starch in a given system will take place and influence the degree of gelatinization. A number of factors are to be considered. First of all, granule organization and degree of gelatinization are controlled by the major molecular components present. For instance, the presence of solutes such as sugars, salt, and gums or lipids may increase gelatinization temperature and result in limiting the degree of gelatinization depending upon processing conditions. Regardless of what major molecular component is present, gelatinization is controlled by the amylose content. In a comparison of fully gelatinized starches, (amylose content in excess of 40%) have higher viscosity and firmer gels at elevated concentration levels; whereas, high amylopectin starches have lower viscosity and softer gels at similar concentration levels. It appears that gelation occurs through hydrogen bonding producing a network of junction zones between molecules. Presumably, crystalline regions form, particularly with high amylose starches, and provide additional gel strength and stability. The presence of additional solute molecules (hydrocolloids), that potentially hydrogen bond, will play an important role in the viscosity and gelling behavior of starch/gum based ingredients.

It has also been observed that cold water is able to diffuse and penetrate freely into the amorphous regions of the starch granule without disturbing the crystalline regions. It is believed that high molecular weight solutes are less able to penetrate the granule, with the consequence that water is absorbed selectively. Smaller molecular weight solutes, on the other hand, have been shown to sorb into these amorphous regions of the granule. It has been suggested that the soluble molecular chains within a hydrated starch granule specifically bind in double helix formation with linear oligosaccharides, and it has been postulated that during heating and surface granule swelling, other larger hydrophilic hydroxylated chains or portions thereof sorb in a similar fashion. The remaining portion of the chain and/or molecule would then cover the surface of the granule and extend from the granule periphery into the media containing the granule. The present invention seeks to take advantage of these probable interactions by intensely co-processing a starch, preferably a high amylose corn starch, with an edible, hydrocolloid, such as guar gum or locust bean gum, or more preferably, xanthan gum, or mixtures thereof.

Referring to the drawing, a conventional, twin screw extruder/cooker is designated 10 and is equipped with multiple heating zones, for this example specifically four zones, respectively designated I, II, III, and IV. As indicated by an arrow 12, a dry ingredient blend, preferably a high amylose or corn starch and hydrocolloid blended in a blender 13, are introduced into the cooking zone I. The dry ingredient blend is added through the dry feed port 14 of the extruder 10 just prior to the addition of water as shown by an arrow 16. Preferably, the starch is present in the range of 50–99% by weight of the non-water ingredients, while the hydrocolloid is present in the range of 1–50%, by weight of the non-water ingredients. The water is added at a ratio in the range of about 0.20 to 0.47 of the weight (16.7–33.3 weight % of the moisture content) of the dry ingredient blend. It is important to note that both the starch and the hydrocolloid are dry, that is, they have not been previously hydrated, but only contain such moisture as would be naturally found in such ingredients prior to any processing.

In zone I, the water and dry mix of starch and gum are partially mixed and conveyed to zone II.

In some instances, the barrel of the extruder may be heated in zone I as indicated by an arrow 18. Typically, if heat is applied, it will be at a relatively low level, say, sufficient to cause a barrel temperature on the order of 30–40° C. On the other hand, in some cases, no heat at all will be applied to zone I, (i.e., ambient temperature or about 20° C). In any event, in zone I, the dry ingredients, i.e., the gum and the starch, are hydrated.

As the material moves from zone I to zone I, additional heat as indicated by an arrow 20 may be supplied through the extruder barrel. Typically, the heat will be sufficient to raise the barrel temperature to a temperature within the range of about 24° C. up to as high as 227° C. In the usual case, the screws of the extruder/cooker 10, in zone II, will be configured to provide a mixing and kneading action.

In zone III, heat again may be added as shown by an arrow 22. In this zone, the extruder screws are configured to subject the melt to higher shear forces, with the barrel being heating to a temperature ranging from about 45° C. to about 230° C.

In zone IV, the temperature of the mixture is increased to be in the range of about 100° C. to 210° C. The introduction of heat into zone IV is indicated schematically by an arrow 24. Zone IV serves mainly to increase the pressure and/or temperature of the melt prior to being extruded through a multi-holed die 26, whereat the extrudate is pelletized by a conventional cutter 28.

Because of the elevated pressure and temperature of the melt, the cooked extrudate will flash off a substantial amount of the added water introduced into zone I. This will cause the extrudate to expand somewhat, i.e., puff.

The extrudate is then fed to a conventional drier 30, whereat its moisture content is reduced to 20% or less, and preferably, 10% or less. Once dried, the extrudate pellets are then fed to a pulverizer 32 which reduces the size of the pellets to a desired size. Typically, it will be reduced to a powder of any particular size desired for further processing. Powders are preferred over the use of larger particles, including small pellets, because they hydrate more rapidly in subsequent processing, and the powdered ingredient of the invention is free flowing in contrast to conventional starches which are not. The starch/gum ingredient, ready for packaging or use in a food product is then removed from the pulverizer 32 as shown by an arrow 34.

Table I below presents weight ratios of hydrocolloid and starch that may be utilized in the ingredients fed into zone I of the extruder. The designation "high amylose starch" designates a starch whose amylose content is 40% or greater. The designation "corn starch" generally refers to a starch having a somewhat lesser amylose content, usually about 23%.

TABLE I

|  | Ratio |
|---|---|
| Example I | |
| Guar:Xanthan: Starch | |
| Guar Gum | 7 |
| Xanthan Gum | 3 |
| High Amylose Starch | 10 |
| Example II | |
| Guar:Xanthan: Starch | |
| Guar Gum | 7 |
| Xanthan Gum | 3 |
| Corn Starch | 10 |
| Example III | |
| Locust:Xanthan: Starch | |
| Locust Bean Gum | 1 |
| Xanthan Gum | 1 |
| Corn Starch | 2 |
| Example IV | |
| Locust:Xanthan: Starch | |
| Locust Bean Gum | 1 |
| Xanthan Gum | 1 |
| High Amylose Starch | 2 |
| Example V | |
| Locust:Xanthan: Starch | |
| Locust Bean Gum | 1 |
| Xanthan Gum | 1 |
| Corn Starch | 6 |
| Example VI | |
| Locust:Xanthan: Starch | |
| Locust Bean Gum | 1 |
| Xanthan Gum | 1 |
| High Amylose Starch | 6 |
| Example VII (A & B) | |
| Locust:Xanthan: Starch | |
| Locust Bean Gum | 1 |
| Xanthan Gum | 1 |
| High Amylose Starch | 38 |

TABLE I-continued

| | Ratio |
|---|---|
| Example VIII | |
| Locust: Starch | |
| Locust Bean Gum | 1 |
| High Amylose Starch | 19 |
| Example IX (A, B, C) | |
| Xanthan: Starch | |
| Xanthan Gum | 1 |
| High Amylose Starch | 19 |
| Example X | |
| Xanthan: Starch | |
| Xanthan Gum | 1 |
| High Amylose Starch | 199 |

The extrusion process used in this invention is a relatively low moisture, high temperature and short residence time process. Due to the high levels of shear and mechanical energy, and the frictional heat generated thereby, viscosity and available moisture play a crucial role in the performance of the extruder as well as in the development of textural properties of the resulting co-processed starch/gum based product. It is somewhat difficult to isolate the effect of individual extrusion processing variables on the resulting product. For example, screw speed affects residence time, shear rate, power consumption, and melt temperature. Extruder barrel temperature controls the thermal energy input which affects the degree of cook which is also dependent upon the moisture level. Barrel temperature also affects the overall viscosity which in turn influences the effect of mechanical shear on the ingredients. Barrel temperature also affects the pressure on the material within the system.

Pressure, then, is a dependent variable, not a controlling variable. However, the pressure level at the die will determine the amount of shear and puffing of the material as well as the amount of moisture flashing off from the extrudate at the die, and thus the rate of evaporative cooling of the product. The rate of drying in turn determines the overall structure and physical state of the co-processed starch/gum based material (whether the starch is in an amorphous or crystalline state). This, in part, affects its functionality when added to a food system. Moisture content also affects the viscosity, amount of shear, and the rate of heat transfer to the melt within the barrel. Thus, it can be seen that there is a considerable interplay between the processing variables. At the same time, certain generalities on the influence of processing parameters used have been observed.

Extruder screw speed affects shear of the material within the extruder. Generally, an increase in product temperature is observed with increasing screw speed due to the additional mechanical energy input into the system. The frictional energy results from the shear exerted by the turning screws on the materials within the extruder and may result in the fracturing of large molecules. The degree of such fracturing will depend on the moisture content. This molecular degradation results in lowering the viscosity of the finished material. Other properties in the extrudate resulting from molecular weight reduction include increased solubility and reduced water absorption.

The amount of heat input to the extruder barrel determines the amount of energy input to the material in the extruder, which is also influenced by the residence time in the extruder which is dependent upon screw speed. Total extruder die surface area as well as the design of the die orifices and screw profile configuration also have an effect. Generally, an increase in temperature when working with the co-processed starch/gum based material will result in a slight drop in viscosity within the extruder. This results in a smoother, more flowable melt within the extruder through the die and thus, less structural damage, and slightly less cook, due to increased flow rates. Increasing temperature also reduces the overall pressure of the system for the same reason and therefore, the resulting product has decreased solubility due to less molecular degradation and higher water absorption. Viscosity of the extrudate leaving the barrel may be dependent to some extent on the specific type of starch being extruded. There will also be a maximum temperature point at which any further increase of the temperature will result in the breaking down of the viscosity. In the case of high amylose starches, this point is less likely to be reached due to the high elevated temperatures required.

The initial moisture content of the material within the extruder (both the inherent moisture of the dry feed itself and the amount of water added to the extruder) will influence the behavior of the material during extrusion as well as the physiochemical properties of the resulting extrudate. If it is desired to fully hydrate the starch, a minimal amount of water is required. The rate at which the moisture is absorbed will also influence the behavior of the material and this is dependent upon the type and initial moisture content of the ingredients. In general, by increasing the initial moisture content, the viscosity of the melt is reduced such that the material flows more readily through the extruder. The higher the moisture content, the greater the amount of thermal energy required to heat the melt. Less molecular degradation occurs as a result of a more flowable product. Decreasing initial moisture also results in increased pressure within the extruder.

The large array of processing variables and the ranges for each parameter make extrusion co-processed starch/gum based materials quite versatile in final product functionality. By adjusting extrusion conditions, the co-processed starch/gum based ingredient may be uncooked, partially cooked or totally cooked as categorized from a gelatinization point of view. In the case with this co-processed starch/gum based ingredient through the interaction of these two components, both the degree of gelatinization and viscosity of the finished material can be controlled. Increasing the degree of gelatinization increases viscosity up to a maximum beyond which viscosity reduction will occur. Each of these physical changes contributes different functionality to a given product. Thus, where properties associated with high gelatinization, such as increased viscosity are required in the product, the processing parameters are manipulated to achieve a greater degree of cook as, for example, by increasing the initial moisture content and/or residence time and/or thermal energy input. On the other hand, where the co-processed starch/gum based ingredient is to be used in applications requiring lower viscosities, the processing parameters are varied to achieve greater rates of shear to achieve a greater degree of molecular degradation.

The various processing parameters for the various dry ingredient ratios are indicated in Table II below. The conditions of shear are directly proportional to the screw speed (in rpm). Table II also indicates the ratio of added water to the total amount of hydrocolloid and starch that serve as dry ingredients, while the designation "mechanical energy" indicates the power drawn by the extruder during operation.

Higher amperages are an indication of the viscosity of the material within the extruder. The greater the number of amperes, the greater the viscosity and the degree of shear.

Table II also indicates the temperatures to which the extruder barrel was heated in each of the four zones, as well as the moisture content of the extrudate as it emerged from the die 26.

processing aid. Because of the low viscosity imparted to the soup base during processing, the same heats faster. The lower viscosity also reduces the energy required for pumping the soup base from one location to another during manufacture.

In addition, the co-processed starch/gum based ingredient imparts a creamy texture to the soup as well as whitening the

TABLE II

| Ex. # | Screw Speed (RPM) | Water/Dry Feed Ratio | Mechanical Energy (amps) | Zone 1 (° C.) | Zone 2 (° C.) | Zone 3 (° C.) | Zone 4 (° C.) | Discharge Moisture (% Dry Basis) |
|---|---|---|---|---|---|---|---|---|
| I | 250 | 0.28–0.33 | 140–98 | 20.5 | 24.5 | 55.3 | 101–120 | 32–43 |
| II | 250 | 0.25–0.33 | 160–121 | 20.5 | 24.5 | 48 | 111–116 | 40–43 |
| III | 250 | 0.28 | 155–160 | 20.5 | 24.2 | 47 | 108–113 | 38–44 |
| IV | 250 | 0.23–0.39 | 140–169 | — | 31.4 | 59.2 | 105–152 | 34–51 |
| V | 250 | 0.20–0.23 | 113–165 | — | 38.9 | 65.8 | 145–151 | 31–38 |
| VI | 250 | 0.20–0.21 | 144–180 | — | 37.8 | 66.7 | 153–174 | 32–35 |
| VII A | 250 | 0.24 | 118 | — | 114 | 160 | 177 | 47.9 |
| VII B | 180 | 0.32 | 118–157 | — | 114 | 160 | 191–198 | 45–50 |
| VIII | 180 | 0.34–0.37 | 79–92 | — | 201 | 188 | 140–180 | 73–78 |
| IX A | 180 | 0.34 | 100–120 | — | 144 | 174 | 169 | 64–69 |
| IX B | 250 | 0.32 | 128 | — | 144 | 174 | 187 | 55 |
| IX C | 190 | 0.47 | 71–100 | 191 | 227 | 228 | 189–207 | — |
| X | 180 | 0.38 | 122–112 | 163 | 184 | 198 | 193 | 32.8 |

The co-processed starch/gum based ingredients made according to the present invention possess substantial advantages over those produced according to the prior art. For one, the process of the invention manufactures the starch/gum based ingredient with relatively low levels of added water. This, in turn, provides two advantages. Firstly, less water needs to be removed from the starch/gum based ingredient in drying the same, thereby reducing the amount of energy required in the process that would otherwise be required to dry the product. And, because there is less water removed from the product in the drying operation, process effluent waste is likewise reduced. Further, the entirety of the dry ingredients are contained in the final product, which in turn means that there is no wastage of the dry product ingredients.

It is believed that the hydrocolloid physically interacts with amylose and coats the remaining portion of the starch granules. As a consequence, the co-processed starch/gum product is a "natural" product in that there is no chemical modification of ingredients. A variety of advantages are obtained. For one, the texture or "mouth feel" of a food product incorporating the starch/gum ingredient is improved in that the co-processed starch/gum based ingredient provides the texture of fat without fat necessarily being present.

The co-processed starch/gum based product serves as a coloring agent. Specifically, it produces whitening in the food product in which it is incorporated and increases the opacity of the food product.

The starch/gum based product also improves flavor release when incorporated in a food product. Its use also results in reducing retrogradation, as compared with normal starch.

The co-processed starch/gum based ingredient may be employed in a variety of food products with efficacy. Examples include soups, and specifically, condensed soup bases, salad dressings, yogurts, frozen desserts, sour creams, sauces such as gravy and spaghetti sauce, and confections such as caramel candy and chocolate sauce.

In soups, the co-processed starch/gum based ingredient (preferably, with high amylose starch) serves as a substantial same and improving its opacity. The soup product will also have a more glossy appearance.

Flavor release is also improved. The co-processed starch/gum ingredient of the present invention replaces, in part, the modified waxy maize starch in the ingredients, which is a factor in masking flavor. The reduction in the modified starch and the improvement in flavor release is obtained because the starch/gum based ingredient is used to replace some or all of the modified starch typically used in such soup bases.

In cultured dairy products (i.e., yogurt or sour cream), the co-processed starch/gum based ingredient, preferabaly with high amylose, is more forgiving to high pressure homogenization as compared with typically used modified starches. There is less tearing apart of the starch molecules during homogenization because the starch/gum based ingredient is not fully hydrated.

In the manufacture of sour creams and yogurts, the co-processed starch/gum based ingredient of the present invention is valuable in terms of allowing the replacement of some or all of the fat typically found in these products. In these products, appearance in terms of the opacity of the product is an important factor to the consumer. Fat acts to scatter light and gives a product good opacity. The same opacity can be obtained in the food product, even with fat removed, by utilizing the starch/gum based ingredient of the present invention. This is due to the inventive product's ability to provide the desired whiteness and sheen and its improved shear resistance during processing. Improved flavor release, due to the reduction or elimination of modified waxy maize starch is also possible in sour creams and yogurts. In addition, energy costs in the manufacture of sour cream and yogurt may be reduced because the reduction in viscosity lowers the back pressure in the heat exchangers typically employed in the manufacture of sour creams and yogurts.

The starch/gum based ingredient provided by Example I is highly shear resistant and binds with water. Thus, it is an ideal ingredient where syneresis is to be avoided. It is also useful in products such as nonfat systems in that it provides whitening and/or increased opacity. Similarly, it stands up well to high temperature processing and consequently is useful in soups, sauces, gravies, and the like. The ingredient of Example I also has relatively good acid stability and, therefore, is useful in products such as tomato-based sauces.

The starch/gum based ingredient provided by Example II provides the advantages of high water holding capacity and relatively high solubility. It does not require high heat processing when combined in a food product and has good shear stability. It also has relatively good acid stability and thus may be used in such products as salad dressings having a low pH.

The main difference between the starch/gum based ingredients of Example III and V is the relative starch content. The lower starch content ingredient is more appropriate for a frozen dessert type product whereas the higher starch content ingredient is more suitable for a candy process such as chocolate sauce. Both ingredients are characterized by high water holding capacity, increased solubility over conventional ingredients used in various products, good shear stability and lower processing viscosity than conventional products. The ingredient of Example III contributes to freeze-thaw stability and may be used as a locust bean extender in frozen desserts whereas the ingredient of Example V can be used to provide viscosity control, i.e., lower viscosity at refrigerated temperatures with less sensitivity to temperature change in, for example, chocolate sauce. Similarly, the ingredient of Example V provides more cling to ice cream than conventional stabilizers.

The ingredients of Examples IV, VI, and VII again differ mainly in their relative starch content. This difference in starch content provides the differences in final product application mentioned above. It is to be noted that the ingredient of Example IV works well in a candy formulation. In general, the properties of Examples IV, VI, and VII may provide the food product with a softer, more flowable texture than conventional formulas. They also make the product less sticky.

Example VIII provides an ingredient that is excellent for retort or high temperature processing as in soups, sauces, gravies and the like. It may be used to improve the rate of heating during retorting and provides whitening and/or increased opacity in nonfat systems. The ingredient of Example VIII is highly shear resistant and may be employed to reduce syneresis.

The ingredients of Examples IX and X differ mainly in their relative starch content and, as mentioned above, this factor can determine the final product application. Properties of both examples include the ability to withstand high temperature retorting or the like and make them useful in soups, sauces, gravies and the like. Both provide whitening and/or increased opacity in nonfat systems and are highly shear resistant. In dairy products such as yogurt, sour cream, puddings and the like, the ingredients of Example IX provide extra sheen. Examples IX and X both may act as a processing aid by reducing initial processing viscosity to thereby increase the rates of heat transfer while providing good finished viscosity and improved mouth feel in, for example, low-fat cream-based soups, as well as dairy products.

Examples of exemplary uses of the starch/gum based ingredient in food products along with comparative examples will now be given. All percents are by weight unless otherwise noted. Processing equipment is as identified and is generally conventional for the type of product of concern.

SOUPS

| Ingredient | % | Ingredient | % |
|---|---|---|---|
| Condensed Soup Base | | Condensed Soup Base | |
| Milk Protein | 2.0 | Milk Protein | 2.0 |
| Vegetable Oil (soy, sunflower, canola, etc.) | 2.0 | Vegetable Oil (soy, sunflower, canola, etc.) | 2.0 |
| Salts & Flavorings | 1.8 | Salts & Flavorings | 1.8 |
| Starch (modified waxy-maize) | 1.9 | Starch (modified waxy maize) | 3.8 |
| Flour | 3.8 | Flour | 3.8 |
| Example IX | 1.9 | Water | 86.6 |
| Water | 86.6 | Total | 100.0 |
| Total | 100.0 | | |

A low-fat model soup base system was prepared by combining milk protein and vegetable oil (prepared as a homogenized emulsion with water), salt, flavor, flour, a modified waxy-maize starch and the balance of the water in a vessel equipped with agitation. In Example A, a portion of the modified waxy-maize starch, as used in Example B, was replaced with a starch/gum based ingredient manufactured as according to Example IX. The mixture was heated to 70° C. and filled into cans. Retort processing conditions were set at 121° C. for fifty-five minutes. Thermocouples were placed at the center point in each can to measure the internal temperature as a function of time. The results of this study showed a significant increase in the rate of heat transfer when the starch/gum based ingredient of the invention was used in comparison to a conventional starch blend. In addition, there was also more rapid cooling. The use of the starch/gum based ingredient was also found to contribute to better flavor release.

GRAVIES

| Ingredient | % | Ingredient | % |
|---|---|---|---|
| Gravy Base | | Gravy Base | |
| Chicken broth | 15.0 | Chicken broth | 15.0 |
| Chicken flavor, dry | 1.0 | Chicken flavor, dry | 1.0 |
| Salt | 1.0 | Salt | 1.0 |
| Cake flour | 2.0 | Cake flour | 3.0 |
| Modified food starch | 3.25 | Modified food starch | 3.25 |
| Example VIII | 1.0 | Water | 76.75 |
| Water | 76.75 | Total | 100.0 |
| Total | 100.0 | | |

A model gravy system was prepared utilizing the starch/gum based ingredient resulting from Example VIII, which is a co-processed starch/gum based ingredient with the hydrocolloid being locust bean gum. The example was chosen for the low acidity of the gravy and the need for a short texture. The gravy was processed by combining the water and chicken broth in a heating vessel. The remaining dry ingredients were pre-blended and added to the liquid mixture under agitation. The mixture was heated to 90° C. and held for five minutes before being packaged into glass containers. The containers were sealed and heated under pressure for one hour at 15 psig. The containers were then cooled and stored at room temperature prior to evaluation.

Viscosity measurements were taken after heating to 93° C., prior to being placed in the retort. The tests showed that the material of Example C had a significantly lower processing viscosity than that of Example D, contributing to improved heat transfer during retorting, just as with the soup base.

The degree of opacity was measured using a colorimeter. The L-values were significantly higher with the material of Example C than with the control (Example D), indicating the Example C gravy to have a more opaque, white appearance.

SAUCES

| Ingredient | % | Ingredient | % |
|---|---|---|---|
| Spaghetti Sauce | | Spaghetti Sauce | |
| Tomato paste, 28% solids | 35.0 | Tomato paste, 28% solids | 35.0 |
| Salt | 1.0 | Salt | 1.0 |
| Sucrose, dry | 0.5 | Sucrose, dry | 0.5 |
| Commercial spice blend | 0.1 | Commercial spice blend | 0.1 |
| Garlic, granular dehydrated | 0.1 | Garlic, granular dehydrated | 0.1 |
| Example I | 1.0 | Water | 63.3 |
| Water | 62.3 | Total | 100.0 |
| Total | 100.0 | | |

Spaghetti sauce is an acidic food which is processed using a retort system. A common problem with spaghetti sauce is the formation of a watery ring around the sauce (syneresis). Tests were conducted with the starch/gum based ingredient to control the syneresis which occurs in the control sauce (Example F). The spaghetti sauce was prepared by combining tomato paste and water in a heated vessel with agitation. Salt, spices, and sugar were then added and the mixture heated to 93° C., held for five minutes, and packaged into glass containers. The containers were sealed and heated under pressure in a retort for fifteen minutes at 15 psig. The containers were then cooled and stored at room temperature prior to evaluation. In the preparation of Example E, 1.0% of a starch/gum based ingredient made according to Example I was added at the same time as the salt, sugar, and spices. The starch/gum based ingredient also provided a desired final viscosity while controlling the processing viscosity at a relatively low level to increase heat transfer during retort processing. Viscosity measurements were taken after heating to 93° C. prior to retorting. No significant difference in viscosity at this time was detected. The degree of syneresis was greatly reduced in the material prepared according to Example E as compared to the control, Example F.

Additional viscosity measurements were taken of the two examples at 25° C. after they had aged for six days. These later viscosity measurements showed an increase in viscosity with the material of Example E, with no change in the viscosity of the control sample, Example F. The test sample Example E showed better cling on pasta.

NON- OR LOWFAT SOUR CREAMS AND YOGURTS

| Ingredient | % | Ingredient | % |
|---|---|---|---|
| Non-fat Yogurt | | Non-Fat Yogurt | |
| Skim milk | 94.3 | Skim milk | 94.3 |
| Skim milk powder | 3.2 | Skim milk powder | 3.2 |
| Stabilizer* | 1.75 | Stabilizer* | 1.75 |
| Example IX | 0.75 | Modified waxy maize starch | 0.75 |
| Total | 100.0 | Total | 100.0 |

*CC-725 stabilizer available from Continental Colloids, Inc. of West Chicago, Illinois.

| Ingredient | % | Ingredient | % |
|---|---|---|---|
| Non-fat Sour Cream | | Non-fat Sour Cream | |
| Cream | 2.8 | Cream | 2.8 |
| Skim milk | 87.8 | Skim milk | 87.8 |
| Skim milk powder | 3.4 | Skim milk powder | 3.4 |
| Stabilizer* | 4.9 | Stabilizer* | 4.9 |
| Example IX | 1.1 | Modified waxy maize starch | 1.1 |
| Total | 100.0 | Total | 100.0 |

*CC-760 stabilizer available from Continental Colloids, Inc. of West Chicago, Illinois.

A co-processed starch/gum based ingredient as produced by Example IX was evaluated in nonfat and lowfat sour creams and yogurts. Skim milk and skim milk powder were blended together. A stabilizer and the co-processed starch/gum based ingredient were pre-blended and then added to the milk mixture. Once all of the ingredients were incorporated, the resulting mix was fed to the balance tank of an HTST processing system and pasteurized at 85° C. for thirty seconds and homogenized at 1200 psi in a two-stage Gaulin homogenizer. The yogurt was cooled to 44° C. and inoculated with CHR. Hansen YCO 35 Series yogurt culture and held until a pH of 4.6 was reached. At this point, the yogurt was further cooled, packaged, and stored at refrigeration temperatures. A taste panel evaluation of the yogurt of Example G demonstrated improved texture and mouth feel, as well as a desirable sheen and a better flavor release when compared to the control yogurt of Example H.

Nonfat sour cream was processed similarly to the yogurt examples. Skim milk and skim milk powder were blended together. Again, the stabilizer and the co-processed starch/gum based ingredient were pre-blended and added to the milk mixture. The cream was then added. The sour cream was processed using HTST pasteurization temperatures of 85° C. for thirty seconds and then homogenized at 2500 psi with a two-stage Gaulin homogenizer. It was then cooled to 26° C. and inoculated with CHR Hansen DSG 2000 Series sour cream culture and held until the titratable acidity was 0.85, upon which the sour cream was further cooled, packaged, and stored at refrigeration temperatures. Viscosity measurements were conducted during different stages of the processing. The results of the viscosity measurements in connection with the evaluation of the products twenty-four hours after processing and culturing demonstrated that the co-processed starch/gum based ingredient containing example (Example J) was very shear resistant as compared to the control example (Example K). As seen with the yogurt, there was also observed a more desirable sheen and flavor release with the product containing the co-processed starch/gum based ingredient (Example J) than with the control example (Example K).

It was also noted in both the yogurt and sour cream examples that the co-processed starch/gum based ingredient contributed a unique opacity and white color not seen with other starches and/or gums. Typically, nonfat products are inferior in color to their full fat counterparts which have high degrees of opacity, whereas nonfat products are generally viewed as translucent and slightly blue in color. In many cases, an artificial white color is used to offset the translucent and slightly blue appearance. By transmitting opacity and a white color to nonfat products, the co-processed starch/gum based ingredient provides a natural alternative to other ingredients to make nonfat products appear more appetizing.

FROZEN DESSERTS

| Ingredient | % | Ingredient | % |
|---|---|---|---|
| Non-fat Ice Cream | | Non-fat Ice Cream | |
| Skim milk | 70.3 | Skim milk | 70.3 |
| Skim milk powder | 6.65 | Skim milk powder | 6.65 |
| Cane sugar | 11.5 | Cane sugar | 11.5 |
| Corn sugar, 36DE | 9.75 | Corn sugar, 36DE | 9.75 |
| Maltodextrin, 10DE | 1.00 | Maltodextrin | 1.0 |
| Stabilizer* | 0.65 | Stabilizer* | 0.65 |
| Example III | 0.15 | Locust bean gum | 0.15 |
| Total | 100.0 | Total | 100.0 |

*CC-452 stabilizer available from Continental Colloids, Inc. of West Chicago, Illinois.

Nonfat ice creams were made to evaluate the effectiveness of the co-processed starch/gum based ingredient as an alternative to hydrocolloids with high, relatively unstable prices. The co-processed starch/gum based ingredient as described in Example III was utilized in Example L in lieu of locust bean gum used in the control example, Example M. Liquid corn sugar and cane sugar were added to a Breddo liquifier, followed by skim milk powder and maltodextrin. This addition was then followed by the addition of the stabilizer and the co-processed starch/gum based ingredient of Example III. Once incorporated, the skim milk was blended in and the mix was fed to the balance tank of an HTST processing system. The mix was pasteurized at 85° C. for thirty seconds and homogenized at 2500 psi in a two-stage Gaulin homogenizer. The ice cream was then frozen through a Cherry Burrell continuous ice cream freezer at temperatures of −6° C. and 100% overrun. Samples were collected in pint containers and further hardened at −34° C. for twenty-four hours. One set of samples was placed in a −18° C. tempering cabinet and another was placed in a cabinet with temperatures fluctuating between −23° C. and −13° C. to evaluate the performance of the product after storage and temperature abuse.

Viscosity of the two mixes was monitored during the processing of the ice cream. Freezing points and rates of freezing were measured. Freeze-thaw stability and sensory evaluations after hardening were performed. The differences in viscosity, freezing points, and rates of freezing were not significant between the two examples. Sensory evaluations were performed by a taste panel. Samples with and without temperature abuse were analyzed in separate evaluations. Statistically, when the overall textural attributes were evaluated, there were no differences between the two examples. These results show the effectiveness of using the co-processed starch/gum based ingredient as a replacement for the more expensive locust bean gum in this particular application.

CHOCOLATE SAUCE

| Ingredient | % | Ingredient | % |
|---|---|---|---|
| Chocolate Varigate Sauce | | Chocolate Varigate Sauce | |
| Cocoa Powder 10/12% fat | 8.00 | Cocoa Powder 10/12% fat | 8.00 |
| Sucrose, dry | 25.00 | Sucrose, dry | 25.00 |
| 42% HFCS, 71% solids | 35.00 | 42% HFCS, 71% solids | 35.00 |
| Corn sugar, 36 DE | 4.10 | Corn sugar, 36 DE | 4.10 |
| Maltodextrin, 10 DE | 2.20 | Maltodextrin, 10 DE | 2.70 |
| Salt | 0.10 | Salt | 0.10 |
| Potassium sorbate | 0.10 | Potassium sorbate | 0.10 |
| Example V | 0.50 | Water | 25.00 |
| Water | 25.00 | Total | 100.0 |
| Total | 100.0 | | |

Chocolate varigate sauce is a high solids product that must remain fluid throughout a broad range of temperatures. It is heated to be pasteurized, stored at room temperature, and held refrigerated after the packaging has been opened. It should flow over ice cream, but not run entirely to the bottom of the serving dish. Good cling is highly desirable. The chocolate sauce was prepared utilizing the co-processed starch/gum based ingredient resulting from Example VI. The co-processed starch/gum based ingredient was substituted for a portion of the maltodextrin in the formula in order to provide a controlled processing viscosity and to improve the cling of the sauce. The chocolate varigate sauce was processed by combining water and 42HFCS in a steam kettle. The remaining ingredients were added under good agitation and the mixture was pasteurized at 85° C. for five minutes and then homogenized at 1,000 psi with a single stage of a Gaulin homogenizer. The chocolate sauce was packaged hot and stored at room temperature prior to evaluation.

Viscosity measurements were taken after processing to 85° C., after cooling to 25° C., and after storage at 4° C. There was no significant difference in processing viscosity. The viscosity at 25° C. and at 4° C. indicated that the viscosity of the sauce including the co-processed starch/gum based ingredient (Example N) was greater at 25° C. and lesser at 4° C. than the viscosity of the control sample, Example O. The degree of cling was measured by weighing an amount of chocolate sauce onto a known weight of ice cream. The amount of chocolate which did not remain on the ice cream after one minute was then weighed and the percentage cling calculated. The test sample (Example N) had a significantly higher percentage of cling than the control, Example O.

CARAMEL CANDY

| Ingredient | % | Ingredient | % |
|---|---|---|---|
| Caramel Candy | | Caramel Candy | |
| Butter, salted | 16.1 | Butter, salted | 16.1 |
| Light brown sugar | 32.2 | Light brown sugar | 32.2 |

-continued

| Ingredient | % | Ingredient | % |
| --- | --- | --- | --- |
| Corn sugar, 36 DE | 23.2 | Corn sugar, 36 DE | 23.7 |
| Sweetened condensed whole milk | 28.0 | Sweetened condensed whole milk | 28.0 |
| Example VI | 0.5 | Total | 100.0 |
| Total | 100.0 | | |

Caramels are an example of a very low moisture system processed to high temperatures under high shear conditions. Caramel was made by combining butter, brown sugar, corn syrup, and sweetened condensed whole milk with gentle heat to melt the butter. Once a homogeneous mixture was obtained, heat was increased to 118° C. and the mixture poured onto foil lined, greased pans. The caramel was cooled and stored at room temperature. In the example to be evaluated (Example P), 0.5% of starch/gum based ingredient as obtained from Example VI was substituted for the same percentage of corn syrup. The comparative caramel produced by the Example Q had a firm set, while the sample for evaluation (Example P) was more flowable and softer to the touch. The caramel of Example P was also less sticky than that produced according to Example Q.

SPOONABLE SALAD DRESSING

| Ingredient | % | Ingredient | % |
| --- | --- | --- | --- |
| Soyoil | 20.0 | Soy oil | 20.0 |
| Vinegar, 50 grain | 8.5 | Vinegar, 50 grain | 8.5 |
| sucrose | 6.0 | sucrose | 6.0 |
| Salt | 2.0 | Salt | 2.0 |
| Egg yolk solids | 1.5 | Egg yolk solids | 1.5 |
| Starch, modified waxy maize | 2.6 | Starch, modified waxy maize | 3.6 |
| Xanthan gum | 0.15 | Xanthan gum | 0.2 |
| Potassium sorbate | 0.1 | Potassium sorbate | 0.1 |
| Example II | 1.0 | Water | 58.1 |
| Water | 58.15 | Total | 100.00 |
| Total | 100.00 | | |

Spoonable light salad dressings are an example of an acidic food. Traditionally, a starch paste is prepared from a cook-up starch which is used as a replacement for a portion of the oil employed in such dressings. In Example R, co-processed starch/gum based as described in Example II was substituted for a portion of the starch and xanthan gum in the control sample, Example S. A pilot plant scale Koruma colloid mill was used to prepare the salad dressings. Modified waxy maize starch was incorporated into the water as the water was recirculating. For the purpose of the tests, the co-processed starch/gum based ingredient was pre-blended with the modified waxy starch prior to incorporation into the water. The slurry was cooked to 88° C. and held for five minutes after which cooling water was circulated through the mill jacket. When the temperature was reduced to 26° C., egg yolks, sugar, salt, potassium sorbate and xanthan gum were added to the cooked material with gentle agitation. When a homogeneous mixture was obtained, a vacuum of 7 inches Hg was applied to the mill chamber. Soy oil was then siphoned into the paste over a 10 minute time period. The mixture was then milled for one minute before vinegar was added. Once all the vinegar was added, the entire mixture was milled for another minute, followed by product packaging and storage at 4° C. prior to evaluation.

The finished dressings were tested using a Stevens LFRA texture analyzer with a TA 11 probe descending at one millimeter per second to a depth of 30 millimeters. Measurements were recorded as the force required to compress the sample in gram per unit area. The results showed that the test sample, Example R, was significantly firmer than the control sample, Example S. The test sample was also noted to have better flavor release and a better sheen than the control sample.

From the foregoing, it will be appreciated by those skilled in the art that a co-processed, starch/gum based ingredient provides many unexpected and unique properties and advantages when incorporated in food products. For example, the co-processed, starch/gum based ingredient is readily prepared utilizing conventional equipment and provides substantial processing advantages during its manufacture over prior art products. Similarly, the ability of the co-processed, starch/gum based ingredient to impart desirable characteristics to the food products in which it is incorporated and/or in reducing processing concerns during use in a food product provides substantial advantages that are unexpected, all the while being a natural product that has not been chemically modified.

We claim:

1. A starch/gum based ingredient for use in food products including a starch, a hydrocolloid selected from the group consisting of edible gums, and water co-processed in an extruder under conditions of temperature of about 100° C. or more, and a moisture level in the range of about 16.7% to 33.3% causing an interaction between the hydrocolloid and the starch such that the hydrocolloid coats the starch.

2. The starch/gum based ingredient of claim 1, wherein the weight ratio of hydrocolloid to starch is in the range of 1:19 to 1:1.

3. The starch/gum based ingredient of claim 2, wherein the weight ratio of hydrocolloid to starch is in the range of 1:3 to 1:1.

4. The starch/gum based ingredient of claim 3, wherein the weight ratio of hydrocolloid to starch is about 1:1.

5. A method of making a starch/gum based ingredient for use in food products, comprising:
   a) providing a dry feed of 50–99% starch and 1–50% hydrocolloid selected from the group consisting of xanthan gum, guar gum, and locust bean gum, and mixtures thereof;
   b) introducing the dry feed and water into a cooker/extruder at a water to dry feed ratio of about 0.20–0.47;
   c) mixing the water and the dry feed and elevating the temperature thereof within the cooker/extruder to a temperature within the range of about 100–210° C.;
   d) extruding the product resulting from step c) through a die to expand and partially dry the product;
   e) drying the extruded product to a moisture content of 20% or less; and
   f) reducing the dried extruded product to a desired size.

6. The method of claim 5 wherein step e) includes drying the extruded product to a moisture content of 10% or less.

7. The method of claim 5 wherein step f) includes reducing the dried, extruded product to a powder.

8. The method of claim 5 wherein step c) includes the step of heating at least part of the cooker/extruder to a temperature generally in the range of about 100–200° C.

9. The method of claim 5 wherein said hydrocolloid is xanthan gum.

10. The method of claim 5 wherein said water to dry feed ratio is in the range of about 0.20 to 0.39.

11. The method of claim 10 wherein said water to dry feed ratio is in the range of about 0.20 to 0.33.

12. The method of claim 5 wherein said temperature is at least about 175° C.

13. The method of claim 5 wherein the starch is a high amylose starch.

14. A food product containing an effective amount of the ingredient produced by the method of claim 5 further including additional ingredients of a food product selected from the group consisting of salad dressings, soups, sauces, frozen desserts, confections, yogurts, and sour cream.

15. The food product of claim 14 wherein said effective amount is in the range of about 0.1 to 2.0 percent by weight.

16. The food product of claim 14 wherein said food product is a salad dressing and said effective amount is about one percent by weight.

17. The food product of claim 14 wherein said food product is a condensed soup base and said effective amount is about 1.9 percent by weight.

18. The food product of claim 14 wherein said food product is a nonfat yogurt and said effective amount is about 0.75 percent by weight.

19. The food product of claim 14 wherein said food product is a nonfat ice cream and said effective amount is about 0.15 percent by weight.

20. The food product of claim 14 wherein said food product is a nonfat sour cream and said effective amount is about 1.1 percent by weight.

21. The food product of claim 14 wherein said food product is a sauce and said effective amount is about one percent by weight.

22. The food product of claim 14 wherein said food product is a confection and said effective amount is about 0.5 percent by weight.

23. The food product of claim 22 wherein said confection is a varigating sauce.

24. A starch/gum based ingredient for use in food products and comprising a high amylose starch granules, water, and a hydrocolloid selected from the group consisting of xanthan gum, guar gum, locust bean gum and mixtures thereof co-processed in an extruder at a temperature of at least about 100° C., and a water content of 16.7% to about 33.3%, causing a physical interaction between the hydrocolloid and amylose from the starch to coat the remaining portion of the starch granules with the hydrocolloid.

25. The ingredient of claim 24 wherein said water content is added water in the range of about 0.20 to about 0.47 of the weight of the starch and hydrocolloid.

26. The ingredient of claim 24 wherein said elevated temperature is at least about 100° C.

27. The ingredient of claim 24 wherein said hydrocolloid is xanthan gum.

28. A method of making a starch/gum based ingredient having a gum coating surrounding the starch for inclusion in food products, said method including the steps of:
   a) combining in an extruder dry ingredients including 50–99% of a high amylose starch and 1–50% of xanthan gum with added water in an added water to dry ingredient ratio in the range of about 0.20 to 0.47;
   b) mixing the dry ingredients and added water in the extruder to achieve a uniform blend;
   c) raising the temperature of the mixture resulting from step b) in the extruder to a temperature of at least about 100° C. to hydrate the same;
   d) extruding the material resulting from step c) through a die at a temperature sufficiently high to cause water to flash off said material as said material emerges from the die to partially dry the same;
   e) subdividing the extruded material as it emerges from the die;
   f) drying the subdivided material to a moisture content of 10% or less; and
   g) processing the material resulting from step f) into powder form.

29. The method of claim 28 wherein said mixture is at least partially cooked.

* * * * *